(12) United States Patent
Farago et al.

(10) Patent No.: US 7,881,075 B2
(45) Date of Patent: Feb. 1, 2011

(54) APPARATUS AND METHODS FOR MOUNTING AND RETAINING POWER MONITORING SYSTEMS

(75) Inventors: Jeffrey J. Farago, Franklin, TN (US); David R. Greer, Jr., Charlotte, TN (US); Thomas J. Seifert, Mount Juliet, TN (US)

(73) Assignee: Square D Company, Palatine, IL (US)

( * ) Notice: Subject to any disclaimer, the term of this patent is extended or adjusted under 35 U.S.C. 154(b) by 856 days.

(21) Appl. No.: 11/805,014

(22) Filed: May 22, 2007

(65) Prior Publication Data
US 2008/0291643 A1 Nov. 27, 2008

(51) Int. Cl.
*H05K 7/02* (2006.01)
*H05K 7/04* (2006.01)

(52) U.S. Cl. .................................... 361/810; 361/801
(58) Field of Classification Search ......... 361/801–803, 361/810
See application file for complete search history.

(56) References Cited

U.S. PATENT DOCUMENTS

| | | | | |
|---|---|---|---|---|
| 1,284,890 A * | 11/1918 | Greenleaf | .................. | 248/27.1 |
| 3,599,910 A | 8/1971 | Wipff et al. | .................... | 248/27 |
| 3,828,291 A | 8/1974 | Urani | .......................... | 337/201 |
| 4,148,542 A | 4/1979 | Wood | .......................... | 339/126 |
| 4,440,368 A | 4/1984 | Kitchen | ...................... | 248/27.1 |
| 4,447,106 A * | 5/1984 | Houtz et al. | ................. | 439/544 |
| 4,716,496 A | 12/1987 | Fritsch | ........................ | 361/391 |
| 5,045,655 A | 9/1991 | Ludwig et al. | | |
| 5,586,909 A | 12/1996 | Saba | .......................... | 439/559 |
| 5,861,742 A * | 1/1999 | Miller et al. | ................. | 324/156 |
| 6,109,575 A | 8/2000 | Munson | ....................... | 248/200 |
| 6,181,548 B1 | 1/2001 | Wheeler | ...................... | 361/681 |
| 6,713,997 B2 | 3/2004 | Carlson et al. | ................. | 324/72 |
| 7,059,896 B2 * | 6/2006 | Matthews | .................... | 439/517 |
| 7,090,454 B2 | 8/2006 | Shain | .......................... | 411/431 |
| 7,639,508 B2 * | 12/2009 | Hauser et al. | ................ | 361/759 |

FOREIGN PATENT DOCUMENTS

FR 2.071.583 9/1971
FR 2.333.988 7/1977

OTHER PUBLICATIONS

SOCOMEC Group, "Operating Instructions for DIRIS Model A40/A41," Installation instructions, p. 10, date unknown (71 pages).
Merlin Gerin, "Technical Data Sheet 2003 Power-monitoring Unit PowerLogic System for Power Meter PM500," Installation and Connection, p. 7, 2003 (8 pages).
International Search Report corresponding to co-pending International Patent Application Serial No. PCT/US2008/006388, European Patent Office, dated Oct. 7, 2008, 4 pages.

* cited by examiner

*Primary Examiner*—Hung S Bui

(57) ABSTRACT

A system for mounting and retaining an electronic device in an opening in a door or panel comprises a power monitoring device for monitoring characteristics of the power transmitted through one or more power lines. An apparatus is coupled to the power monitoring device and is adapted to secure the power monitoring device within the panel opening by engaging at least one surface of the panel. The power monitoring device may include a meter base and a display module. The combined meter base/display module assembly or remote-mounted display module may be mounted and retained in the door or panel opening.

2 Claims, 14 Drawing Sheets

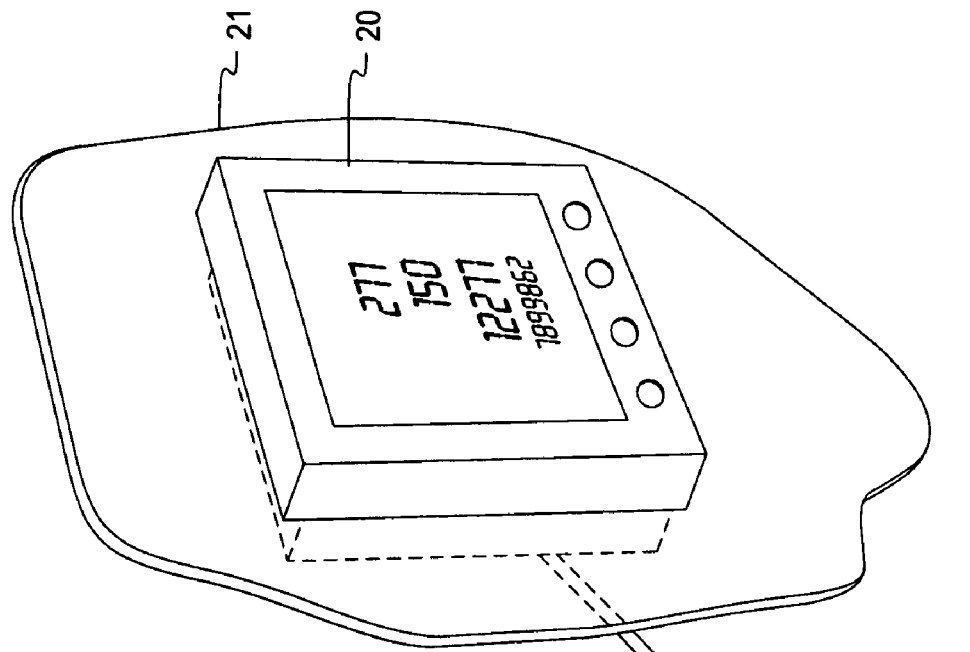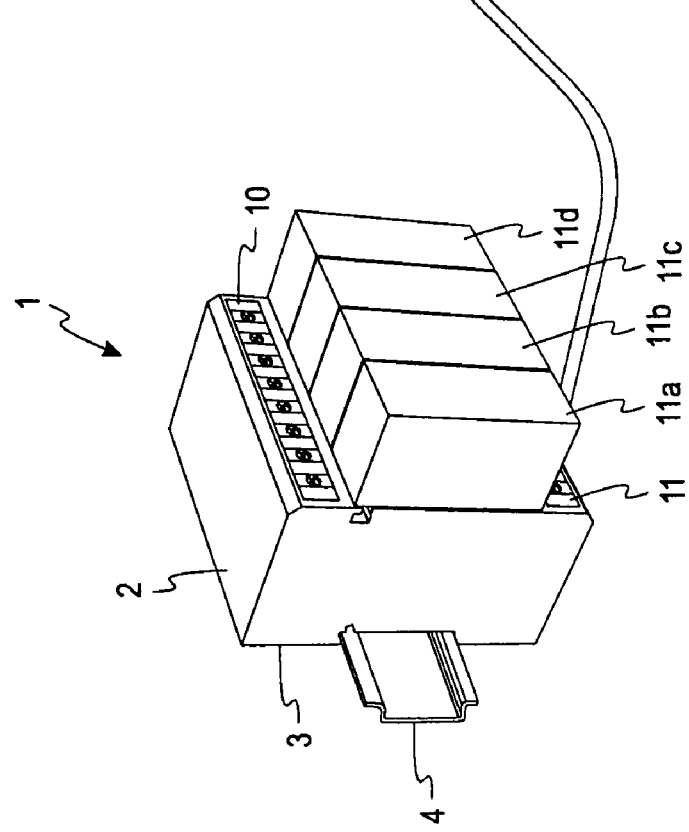
Fig. 2

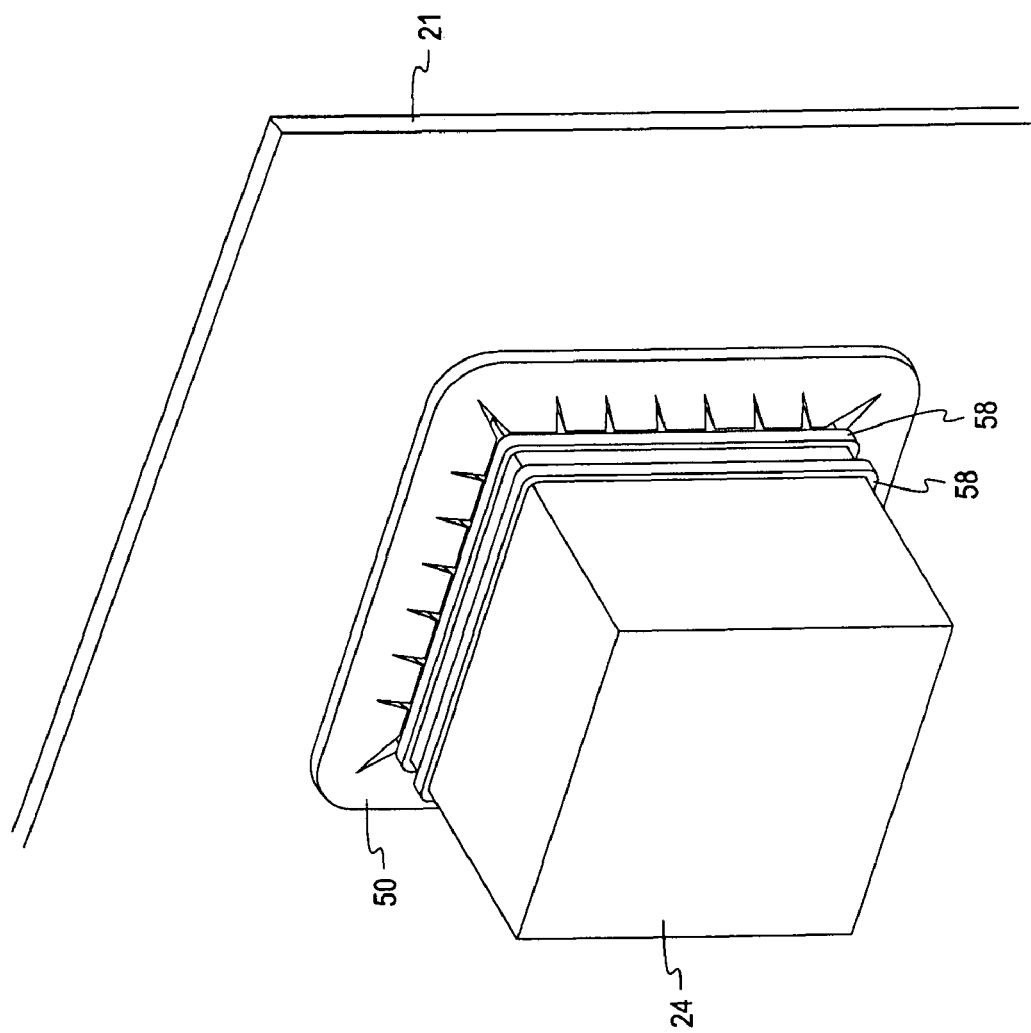

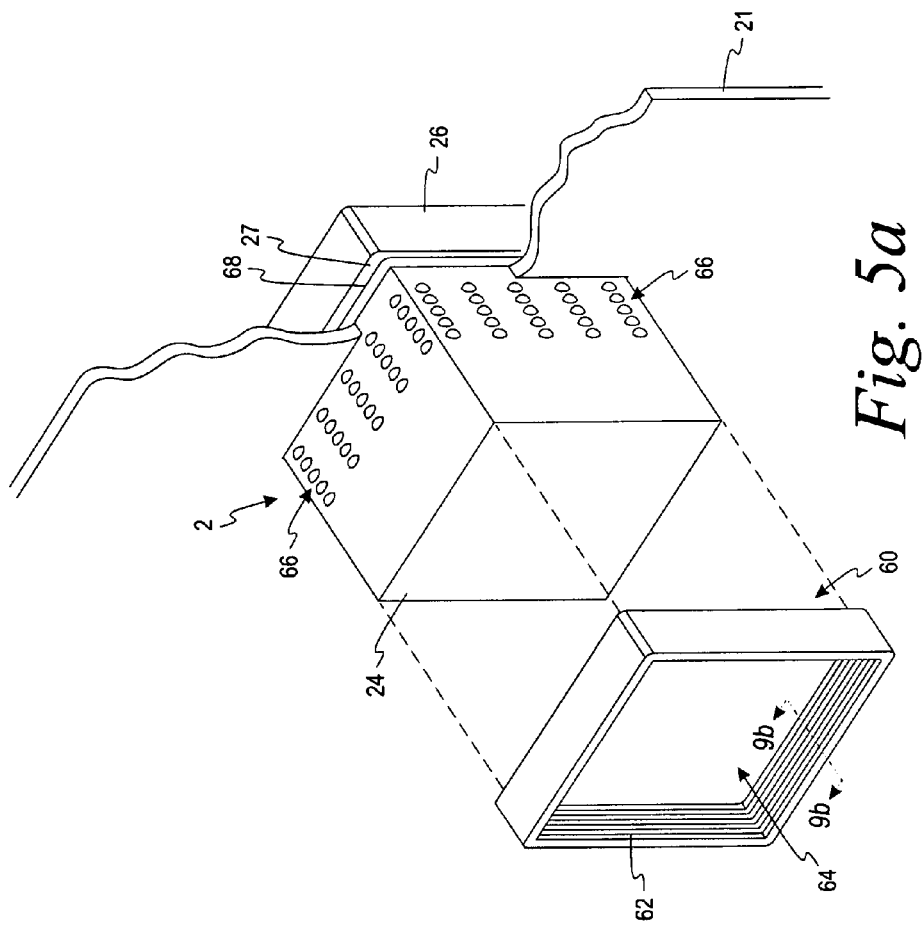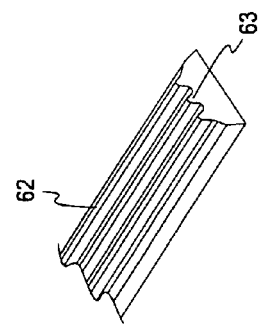

APPARATUS AND METHODS FOR MOUNTING AND RETAINING POWER MONITORING SYSTEMS

FIELD OF THE INVENTION

The present invention relates to apparatus and methods for mounting and retaining power monitoring systems inserted into a door or panel opening.

BACKGROUND OF THE INVENTION

Electronic devices, namely power monitoring systems, are often mounted within a door or panel opening in order to allow access to a display, controls, receptacles, etc. and also to provide a degree of protection to the user from hazardous energies, e.g., electricity. Current mounting and retaining devices are often cumbersome to attach and detach and are relatively costly. They may require tools in order to install such devices on the power monitoring systems and/or to secure them in the door or panel opening. Furthermore, such devices often incorporate small components (e.g., screws, nuts) that can be easily dropped or misplaced.

Therefore, there exists a need for mounting and retaining devices that are inexpensive, easy to attach and detach with minimal or no use of tools and that provide a rapid method of mounting and retaining power monitoring systems in a door or panel opening.

SUMMARY OF THE INVENTION

In one embodiment, a system for mounting and retaining an electronic device in a panel opening comprises a power monitoring device, including a face portion and a body portion, for monitoring characteristics of the power transmitted through one or more power lines. The system also comprises an apparatus coupled to the power monitoring device and adapted to secure the power monitoring device within the panel opening by engaging at least one surface of the panel.

In another embodiment, a method for mounting and retaining an electronic device in a panel having an opening for holding the electronic device comprises the acts of providing a power monitoring device, including a face portion and a body portion, for monitoring characteristics of the power transmitted through one or more power lines. The method also comprises inserting the power monitoring device into the opening in the panel, wherein the face portion is offset from the body portion such that when inserted into the panel opening, the sides of the body portion are generally parallel to the respective sides of the panel opening and the sides of the face portion are generally at an angle with the respective sides of the panel opening. The method further comprises rotating the face portion and the body portion such that the sides of the body portion are generally at an angle with the respective sides of the panel opening and the sides of the face portion are generally parallel with the respective sides of the panel opening and holding the power monitoring device within the panel opening due to the orientation of the body portion and the face portion in relation to the panel opening.

In a further embodiment, a system for mounting and retaining an electronic device in a panel having an opening for holding the electronic device comprises a display module for use with a power monitoring device for monitoring characteristics of the power transmitted through one or more power lines. The system further includes an apparatus coupled to the display module and adapted to secure the display module within the panel opening by engaging at least one surface of the panel.

BRIEF DESCRIPTION OF THE DRAWINGS

The foregoing and other advantages of the invention will become apparent upon reading the following detailed description and upon reference to the drawings.

FIG. 2 is a front perspective of a remote-mounted display module retained in a door or panel opening with a remote-mounted meter base attached via a cable.

FIG. 4D is a rear perspective of the meter retained in door or panel opening via the elastomeric sheet of FIG. 4A.

FIG. 5A is a rear perspective of a meter inserted into an opening in a door or panel and a rear perspective of an elastomeric sleeve for retaining the meter in the opening.

FIG. 5B is a partial cut-away view of the elastomeric sleeve of FIG. 5A.

DETAILED DESCRIPTION OF PREFERRED EMBODIMENTS

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Figure 1:
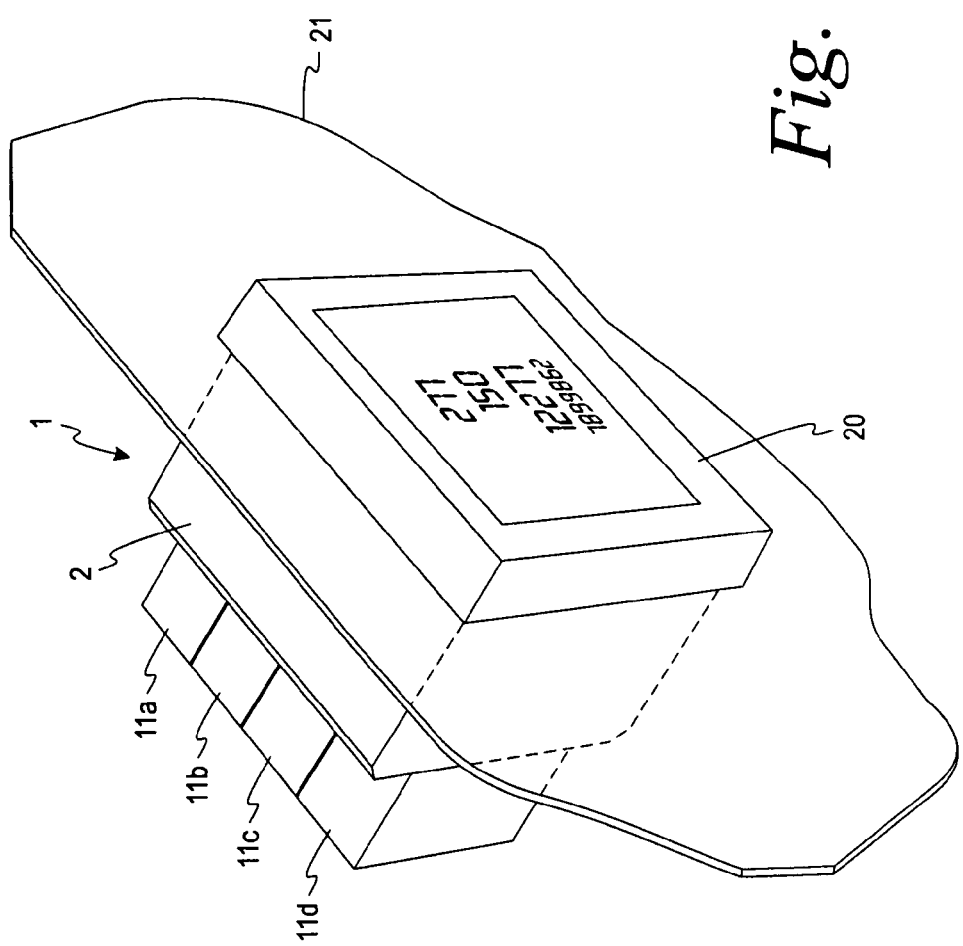
FIG. 1 is a front perspective of a combined meter base and display module assembly retained in a door or panel opening.

Turning to the figures, FIGS. 1-2 illustrate specific embodiments of a power monitoring system for monitoring characteristics of the power transmitted through one or more power lines. The power monitoring systems of FIGS. 1-2 are mounted and retained in a door or panel opening. FIGS. 3-8 illustrate some of the embodiments that may be used to mount and retain the power monitoring systems, such as those shown in FIGS. 1-2. It is contemplated that other electronic devices other than those shown in FIGS. 1-8 may be mounted and retained in a door or panel opening using the apparatus and methods described herein.

Referring first to FIGS. 1 and 2, the central module of one embodiment of a modular power monitoring system is a meter base 1. The meter base 1 includes a housing 2 adapted to be mounted within an opening of a door or panel 21 of a conventional enclosure for power monitoring equipment. A rear surface 3 (see FIG. 2) may include at least one connector (not shown) which may receive a complementary connector from a display module 20 to connect the meter base 1 and the display module 20 to form a meter/display assembly as shown in FIG. 1. The connectors may include hook and snap features integrated in the respective material of the two sub-assemblies. As the meter base 1 and display module 20 are snapped together, at least one connector in the meter base 1 mates with a complementary connector from the display module 20. The resulting meter/display assembly may be inserted through a door or panel opening and secured therein using the mounting and retaining apparatus and methods described below.

FIG. 2 illustrates a remote panel-mounted display module 20 inserted through the opening in a door or panel 21 of an enclosure for the power monitoring equipment. The meter base 1 is mounted on a DIN rail 4, and both data and power are supplied to the display module 20 from the meter base 1 through a cable. Typically, the display module 20 consists of a bezel (frame) with a lens, a display assembly (e.g., glass, diffuser, driver circuit board) and another circuit board with interfacing circuitry and connectors, though other components may be included as well. The display module 20 may be inserted and retained in the door or panel opening using the mounting and retaining apparatus and methods described below.

As shown in FIG. 2, the meter base 1 may include an opposite surface 9 of the housing 2 having upper and lower rows of screw terminals 10 and 11 for attachment to current and voltage lines. In addition, option modules 11a-11d may be connected to the meter base via multiple connectors (not shown) which allow the option modules 11a-11d to be easily attached to, and detached from, the meter base 1. These option modules 11 permit the power monitoring system to be modified to add, or eliminate, various functions provided by different option modules. Detached option modules 11 may be re-attached after servicing, or replaced for maintenance purposes or to upgrade or downgrade the power monitoring system. In the illustrative example, the meter base 1 is designed to accommodate four option modules 11a-11d, but it will be recognized that the design of the meter base can be altered to accommodate more, or fewer, option modules.

Referring now to FIGS. 3-8, these figures illustrate different embodiments of apparatus and methods for mounting and retaining a meter assembly in an opening in a panel 21 and/or for attaching a meter and display that may be mounted in a panel opening. While the mounting and retaining apparatus and methods may be used with the particular meter assemblies shown in FIGS. 3-8, it is recognized that a variety of different meters, modules, displays, etc. may be inserted into an opening in a panel and retained therein using the mounting and retaining apparatus and methods described herein.

Figure 3C:
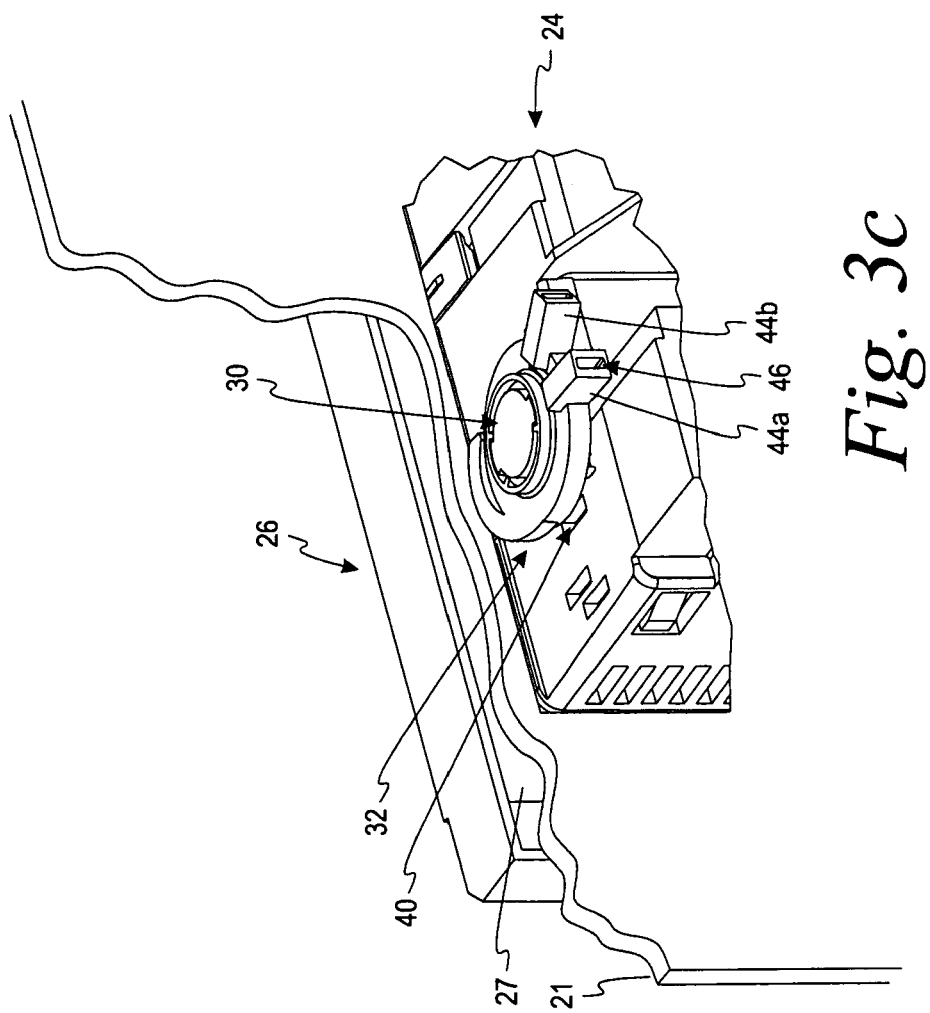
FIG. 3C is a top perspective of the apparatus of FIG. 3A attached to the meter.
Figure 3A:
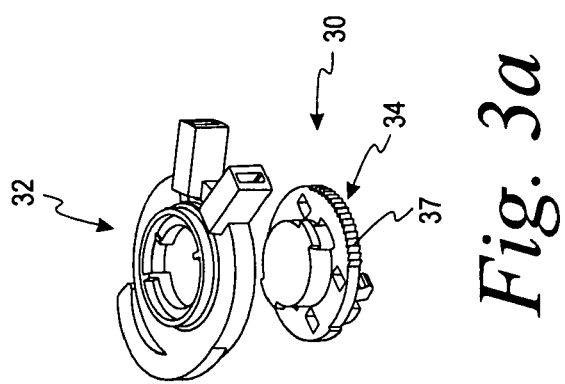
FIG. 3A is a top perspective of an apparatus for retaining a meter in a door or panel opening.
Figure 3B:
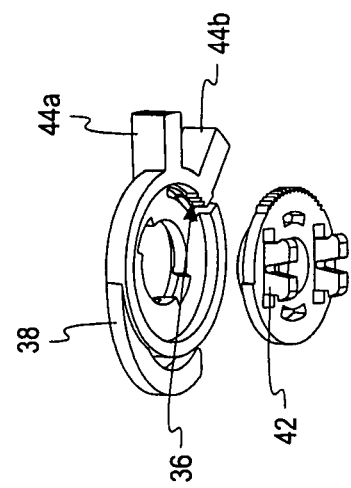
FIG. 3B is a bottom perspective of the apparatus of FIG. 3A.

FIGS. 3A-3C, for example, illustrate a mounting and retention apparatus that may be attached to one or more sides of the housing 2 of the meter base 1. The apparatus includes an inner component 30 and an outer component 32, as shown in FIG. 3A. The inner component 30 includes a circular central toothed hub 34. The outer component 32 caps the inner component 30 and provides an interfacing locking flex member 36 and a cam element 38, such as a spring member, as shown in FIG. 3B. The cam element 38 may be a curved, cantilevered arm that can act like a "leaf" spring, as it resists being bent due to its shape and material. Such resistance of the cam element 38 exerts a "pushback" force as it comes into contact with a surface.

As the inner component 30 and the outer component 32 are mated together, via an aperture in the outer component 32 that surrounds the central portion of the inner component 30, the outer component 32 may be rotated around the inner component 30 (which is made stationary by the hooks and posts described below). As the outer component 32 is rotated by, for example, manually pushing projecting portion 44a of the outer component 32 in a counterclockwise direction, the locking flex member 36 slips or passes over the inner teeth 37 of the circular central toothed hub 34. Continued rotation of the outer component 32 relative to the inner component 30 brings the cam element 38 into contact with the rear surface of the door or panel 21. As the outer component 32 is pushed to a point where it can no longer be rotated, the rotation stops and the inner teeth 37 of the circular central toothed hub 34 lock against the locking flex member 36.

FIG. 3C illustrates the assembled inner component 30 and the outer component 32 attached to at least one side of the housing 2 of the meter. More than one mounting and retaining apparatus, e.g., two, four, etc., having an inner component 30 and outer component 32, may be coupled to the housing 2 of the meter. Once the power monitoring equipment is inserted into an opening in the door or panel 21, the inner component 30 may be snapped into slots 40 in the housing 2 via hooks or posts 42 attached to the bottom surface of the inner component 30. The hooks or posts 42 are pushed into the slots 40 in the housing 2 and are deformed inwardly, holding the hooks or posts 42 within the slots 40 and anchoring the inner component 30 to the housing 2. Once the retainer is anchored to the housing, the inner component 30 remains immobile.

In operation, as the cam element 38 advances increasingly against the panel surface as the outer component 32 is rotated, i.e., in a counterclockwise direction, the cam element 38 exerts a force on the rear surface of the panel 21, causing a face portion 26 of the housing 2 to be pulled toward the front surface of the panel 21. A flange 27 extending around a portion of the housing 2 and having a perimeter that is larger than the perimeter of the panel opening, is pulled up to the front surface of the panel 21 such that the flange 27 abuts the front surface of the panel 21 but is too large to be pulled through the panel opening. The power monitoring equipment is held in place within the panel opening due to the force of the cam element 38 on the rear surface of the panel 21 pulling the flange 27 up to the front surface of the panel 21.

To disengage the teeth 37 from the locking flex member 36, the locking flex member 36 is rotated away from the toothed hub 34, i.e., in the clockwise direction, by pulling on the projecting portion 44b to a relaxed, unlocked position. The locking flex member 36 may be deflected outward either by hand or by utilizing a small tool, e.g., a small flat-bladed screwdriver, which can be inserted into an opening 46 in the ends of the projecting portions 44. Using a small tool allows a user to rotate the outer component 32 in situations where there is a tight fit and it is not reasonable to use a finger to manually turn the outer component 32. This allows the outer component 32 to rotate to the unlocked, non-retaining position. To remove the power monitoring equipment from the door or panel 21, the hooks or posts 42 of the inner component 30 may be removed from the slots 42 in the housing 2 and the power monitoring equipment may be pulled out of the panel opening.

The mounting and retaining apparatus shown in FIGS. 3A-3C may be used in residential, commercial or industrial environments and with different types of electronic devices other than power monitoring equipment. A primary use for such an apparatus is to retain an electronic device nearly anywhere that the electronic device is required to be retained in a door or panel, without the need for additional parts or tools. Such fasteners provide an inexpensive, easily attachable/detachable solution for small electronic devices at a low cost and with a low-profile form factor, i.e., less than 3/16 of an inch. Present designs on the market are too cumbersome to attach and detach, are more costly and require greater height to achieve retention. To enhance the sealing effects, a gasket may also be used with this and other of the apparatus described below.

Figure 4A:
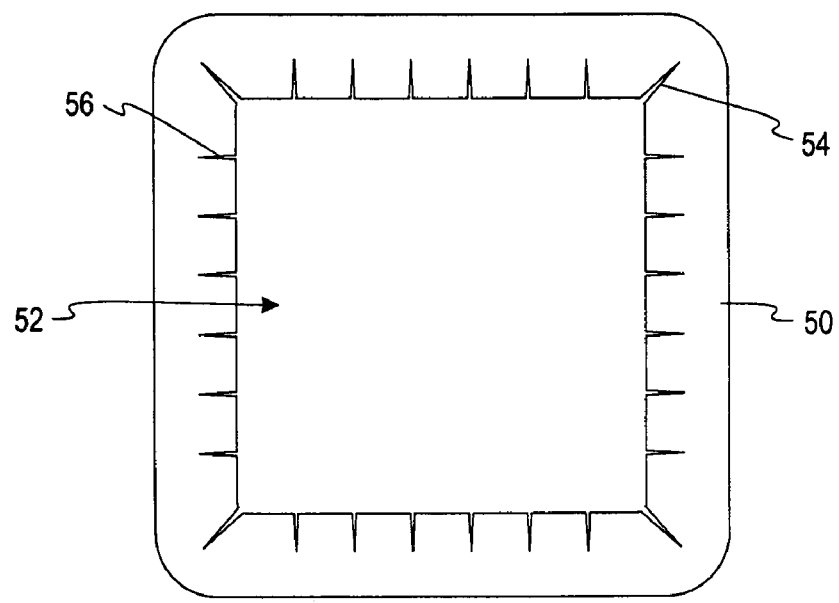
FIG. 4A is a front or rear perspective of an elastomeric sheet for retaining a meter in a door or panel opening.
Figure 4B:
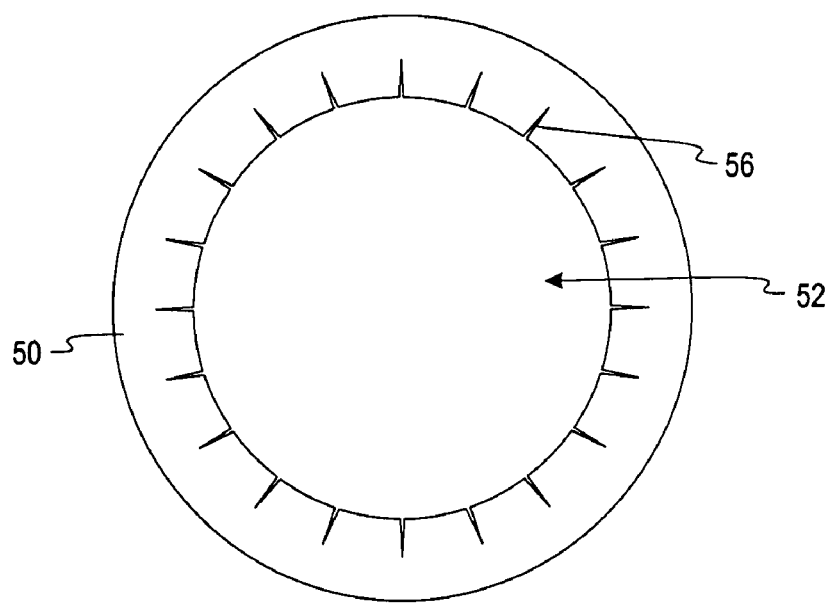
FIG. 4B is a front or rear perspective of another embodiment of an elastomeric sheet for retaining a meter in a door or panel opening.
Figure 4C:
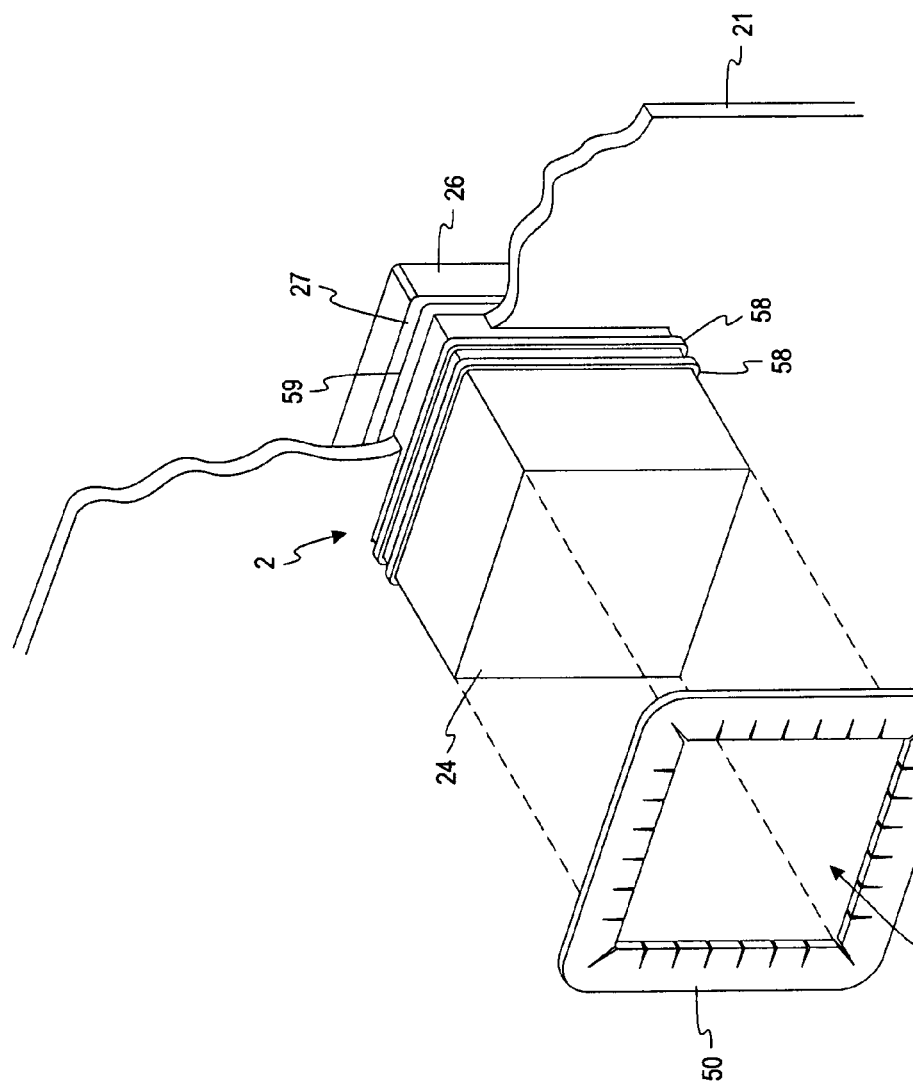
FIG. 4C is a rear perspective of the meter inserted into an opening in a door or panel and a rear perspective of the elastomeric sheet of FIG. 4A.

FIGS. 4A-4D illustrate another apparatus for mounting and retaining power monitoring equipment in an opening in a door or panel 21. The apparatus includes an elastomeric sheet or washer 50 having an aperture 52 that is positioned around the body portion 24 of the housing 2 of the meter and is slid towards the rear surface of the door or panel 21, as shown in FIG. 4C. The elastomeric sheet or washer 50 may be made from a natural or synthetic rubber material, such as neoprene or silicone rubber, and may be die-cut and include main slits 54 for corners and partial slits 56 along the inside edge of the aperture 52, as shown in FIGS. 4A and 4B. These slits 54, 56 are able to conform to the shape of the power monitoring equipment, particularly where the equipment includes a ribbed or barbed profile 58 attached or integrated into the housing 2, as shown in FIG. 4C. The ribbed or barbed profile 58 may be a ring of bumps or protrusions extending continuously around the housing 2 of the meter or around only a portion of the housing 2 of the meter.

Thus, as the elastomeric sheet or washer 50 is slid forward over the ribbed or barbed profile 58 on the power monitoring equipment, the slits 54, 56 flex over the ribbed or barbed profile 58 and engage the housing 2 to hold it within the panel opening, as shown in FIG. 4D. The elastomeric sheet or washer 50 is compressed slightly as it presses against the rear surface of the panel 21. This produces a force on the housing 2 via the ribbed or barbed profile 58 which pulls the flange 27 of the housing 2 against the front surface of the panel 21 and secures the equipment within the opening. This provides some sealing benefits as well as an anti-rattle feature.

The elastomeric sheet or washer 50 may be square (FIG. 4A), circular (FIG. 4B), rectilinear or other shapes, depending on the shape of the power monitoring equipment to be mounted. The thickness of the elastomeric sheet or washer 50 may vary, depending on the weight of the electronic device to be mounted, which may range from a 8-9 ounces up to about 3-4 pounds. The thickness of the elastomeric sheet or washer 50 may range from 0.060 inch to about 0.25 inch. A typical thickness may be about 3/16 of an inch.

The elastomeric sheet or washer 50 may be used in conjunction with a compressible gasket 59 that is positioned between a flange 27 of the housing 2 and the front surface of the door or panel 21 (see FIG. 4C). As the elastomeric sheet or washer 50 is cinched towards the rear surface of the door or panel 21, it causes the gasket 59 to compress between the flange 27 of the housing 2 and the front surface of the door or panel 21. This adds to the sealing effects of the installation.

The elastomeric sheet or washer 50 may be used in residential, commercial or industrial environments with different types of electronic devices other than power monitoring equipment, nearly anywhere such a device is required to be retained in a door or panel 21, without the need for additional parts or tools. It provides an inexpensive solution for door- or panel-mounted electronic devices over other designs that are either cumbersome to attach and detach and are more costly. The elastomeric sheet or washer 50 also helps to reduce dust infiltration, oil spray, mist, liquids, etc. from contacting portions of the power monitoring equipment.

Figure 5C:
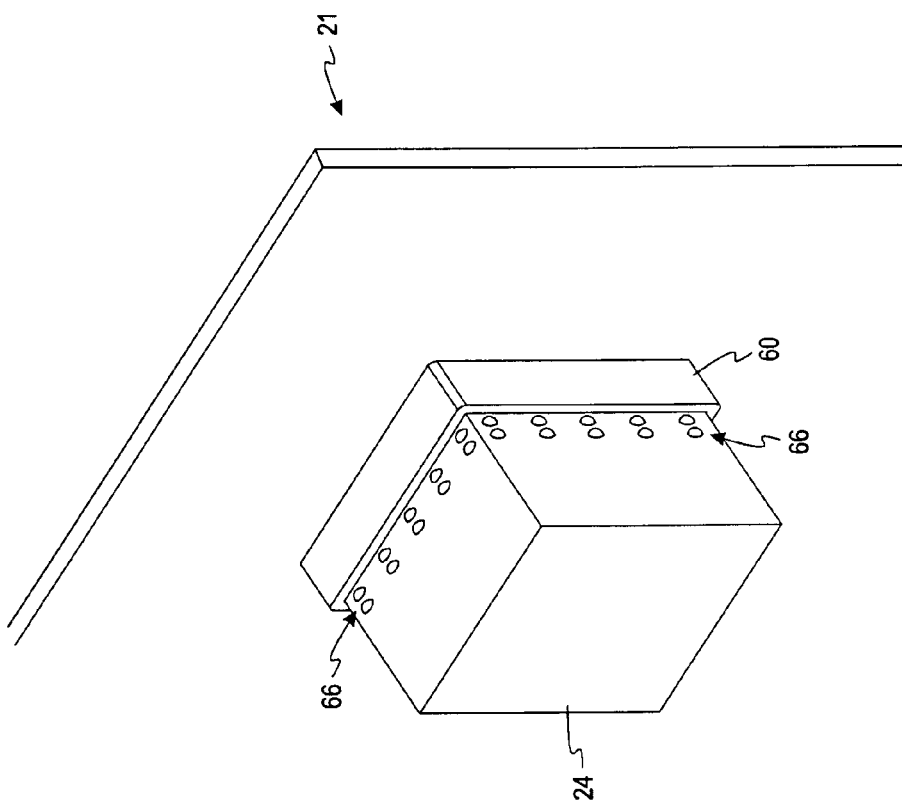
FIG. 5C is a rear perspective of a meter retained in a door or panel opening via the elastomeric sleeve of FIG. 5A.

FIGS. 5A-5C illustrate another apparatus for mounting and retaining power monitoring equipment in a door or panel opening. The apparatus includes an elastomeric sleeve 60, as shown in FIG. 5A, having internal ribbing 62 extending around the inside portion of the elastomeric sleeve 60. The elastomeric sleeve 60 with integrated ribbing 62 may be fabricated from an elastomeric material, such as Santoprene®. The ribbing 62 may include short indentations 63 for conforming to specific features of the power monitoring equipment.

The elastomeric sleeve 60 includes an aperture 64 that is positioned around the body portion 24 of the housing 2 of the meter and slid towards the rear surface of the door or panel 21. The flexible internal ribbing 62 conforms to the shape of the housing 2 of the power monitoring equipment, particularly where the meter includes ribbed or barbed features 66. The ribbed or barbed features 66 may include a ring of bumps or protrusions continuously around the housing 2 of the meter or around only a portion of the housing 2 of the meter. The elastomeric sleeve 60 is compressed slightly as it presses against the rear surface of the panel 21. This produces a force on the housing 2 via the ribbed or barbed features 66 which pulls the flange 27 of the housing 2 against the front surface of the panel 21, securing the equipment within the opening. This provides some sealing benefits as well as an anti-rattle feature.

The elastomeric sleeve 60 may be square, circular, rectilinear or other shapes, depending on the shape of body of the power monitoring equipment to be mounted. The thickness of the elastomeric sleeve 60 may vary, depending on the weight of the electronic device to be mounted, which may range from a 8-9 ounces up to about 3-4 pounds. The thickness of the elastomeric sleeve 30 may range from about 0.080 inch to about 0.125 inch. A typical thickness may be about 0.100 inch. The rib height can typically range from 0.050 inch to 0.125 inch. Shorter ribs, i.e., ribs with heights that range from about 0.050 inch to about 0.070 inch work well with high-count fine pitch ribbing on the elastomeric sleeve 60 in combination with fine pitch retention features on the meter housing 2. Thus, for a wide range of panel thickness locking points, it is advantageous to use a fine-ribbed or bump pattern on the meter housing 2 due to the increased quantity of interlocking points. Taller ribs, i.e., ribs with heights that range from about 0.075 to about 0.125 inch work well with low-count gross pitch ribbing on the elastomeric sleeve 60 in combination with gross pitch retention features on the meter housing 2. Thus, more robust ribbing, i.e., that is thicker and taller, may be used to achieve a strong interlock between the elastomeric sleeve 60 and the meter housing 2.

The elastomeric sleeve 60 may be used in conjunction with a compressible gasket 68 that is positioned between a flange 27 of the housing 2 of the power monitoring equipment and the front surface of the door or panel 21. As the elastomeric sleeve 60 is cinched towards the rear surface of the door or panel 21, it causes the gasket 68 to compress between the flange 27 of the housing 2 and the front surface of the door or panel 21. This adds to the sealing effects of the installation.

The elastomeric sleeve 60 may be used in residential, commercial or industrial environments and with different types of electronic devices other than power monitoring equipment, nearly anywhere such a device is required to be retained in a door or panel 21, without the need for additional parts or tools. It provides an inexpensive solution for door- or panel-mounted electronic devices over other designs that are either cumbersome to attach and detach and are more costly. The elastomeric sleeve 60 also helps to reduce dust infiltration, oil spray, mist, liquids, etc. from contacting portions of the power monitoring equipment.

Figure 6A:
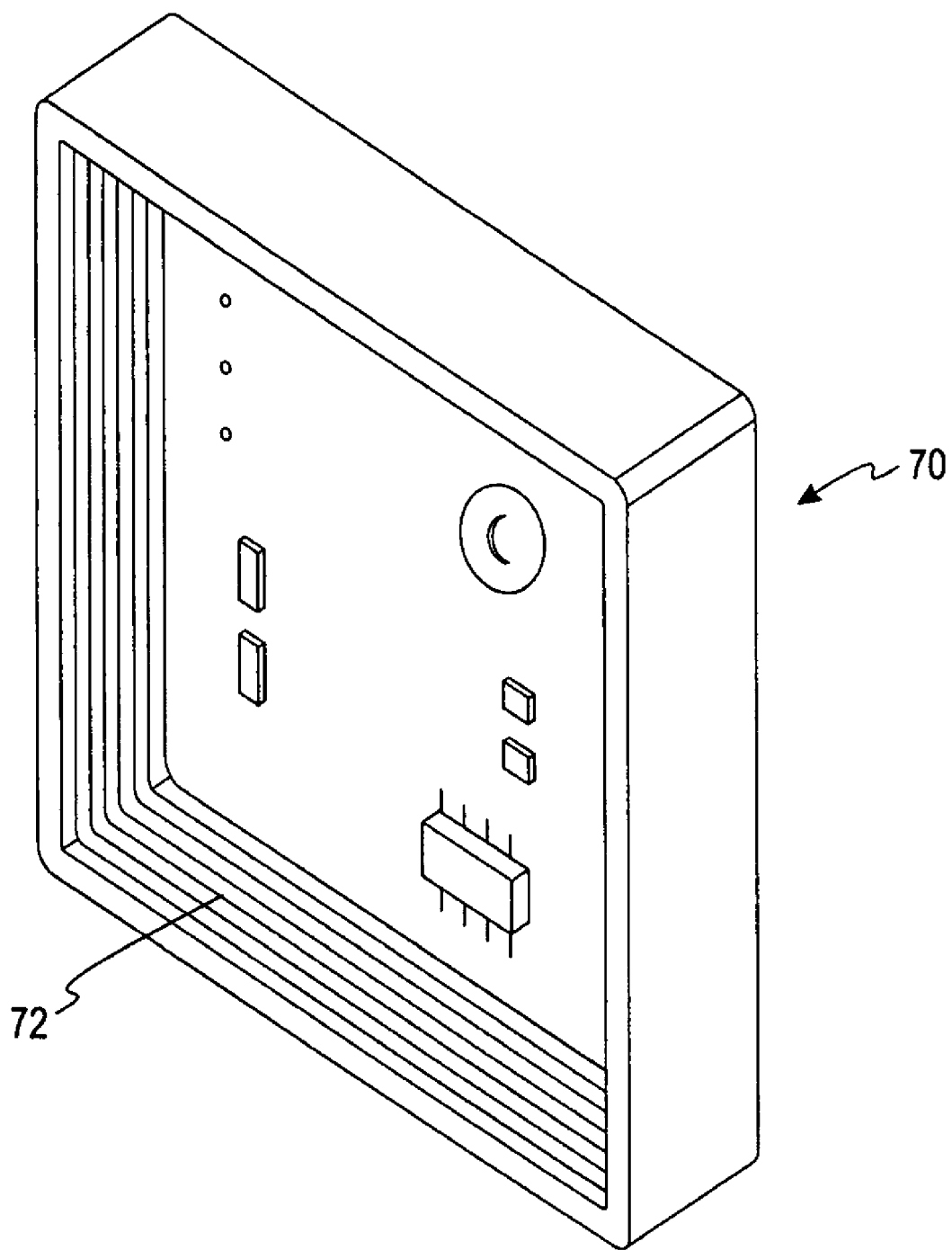
FIG. 6A is a rear perspective of a cover member for attaching to a meter base that may be mounted in an opening in a door or panel.
Figure 6B:
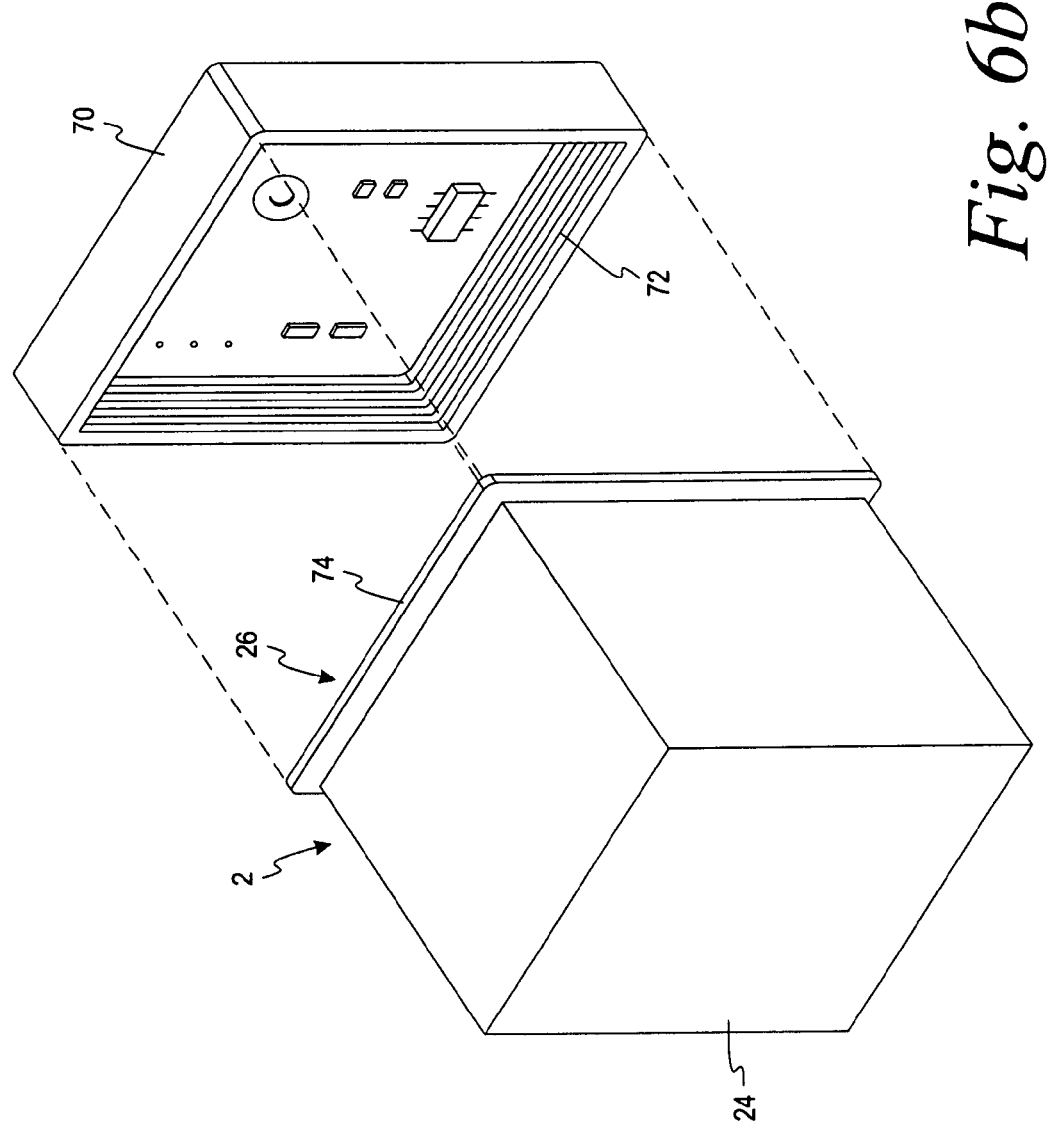
FIG. 6B is a rear perspective of a meter base oriented for assembly to the cover member of FIG. 6A.
Figure 6C:
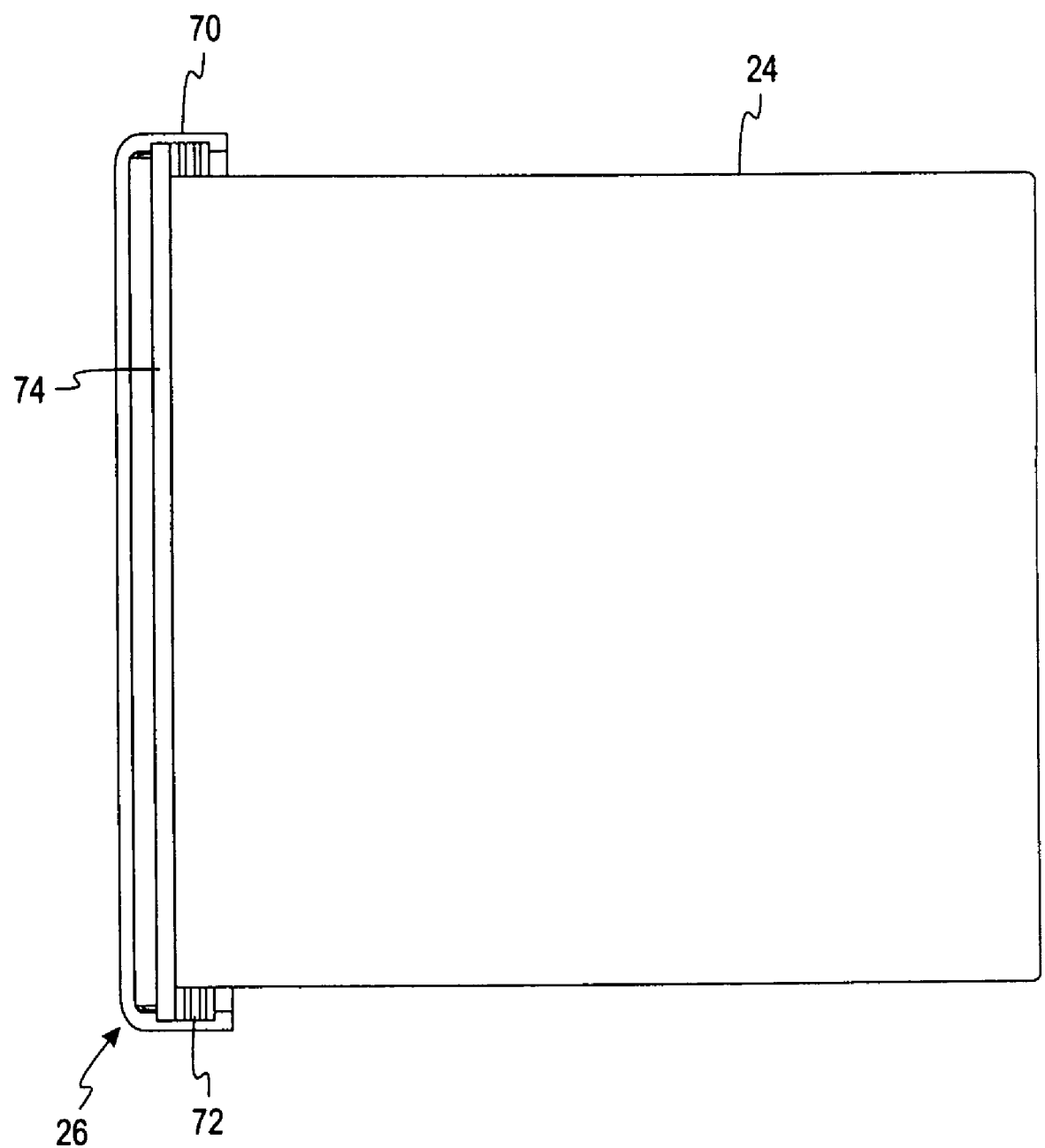
FIG. 6C is a cross-section of the cover member of FIG. 6A coupled to the meter base.

FIGS. 6A-6C illustrate a retention/attachment apparatus that attaches to the face portion 26 of the housing 2. The apparatus includes a cover member or bezel 70 having internal ribbed elements 72 around the inside portion of the cover member or bezel 70, as shown in FIG. 6A. The internal ribbed features 72 may be either integrally molded to the inside surface of the cover member or bezel 70 in a two-shot molding process or inserted into the cover member or bezel 70 as a molded insert or gasket. The internal ribbed features 72 may be formed from a flexible elastomeric material, such as Santoprene®, or may be generally rigid having flexible bumps, rings or a flange. If the cover member or bezel 70 is rigid and the internal ribbed features 72 are flexible, the internal ribbed features 72 may be made by second shot molding or overmolding techniques. Depending upon the designer, the tool maker, or the manufacturing engineer's preference, some embodiments may be formed having flexible ribbed features 72 in the cover member or bezel 70 with more rigid interfacing features on the housing 2. Alternatively, other embodiments may be fabricated to have raised, flexible features on the surface of the housing 2 and interfacing rigid internal ribbed features 72. The cover member or bezel 70 may also include additional features, such as circuit components, on the inner surface of the cover member or bezel 70 that correspond or mate with features on the face portion 26 of the power monitoring equipment.

In operation, the cover member or bezel 70 may be pressed onto the face portion 26 of the power monitoring equipment such that the internal ribbed features 72 engage a flange 74 of the housing 2. The flange 74 may include ribbed or barbed features such as continuous rings, partial rings, or bumps (not shown). The internal ribbed features 72 of the cover member or bezel 70 may engage the ribbed or barbed features of the flange 74 of the power monitoring device to form a gasketed, tight fit.

FIG. 6C illustrates the assembly of the cover member or bezel 70 once it is attached to the face portion 26 of the power monitoring device, with the internal ribbed elements 72 engaging the flange 74 of the power monitoring device. The depth of the internal ribbed elements 72 may range from about 0.080 inch to about 0.125 inch, and desirably about 0.10 inch. The depth and quantity of the internal ribbed elements 72 as it engages the flange 74 determines the difficulty in separating the cover member or bezel 70 from the face portion 26 of the power monitoring unit.

The retention/attachment apparatus may be used in residential, commercial or industrial environments, and allows the assembly of multiple components without the need for additional parts or tools. The internal ribbed and interfacing feature mechanism also help to reduce dust infiltration, oil spray, mist, liquids, etc. from contacting internal portions of the power monitoring device and adds to the sealing effect of the installation.

Figure 7A:
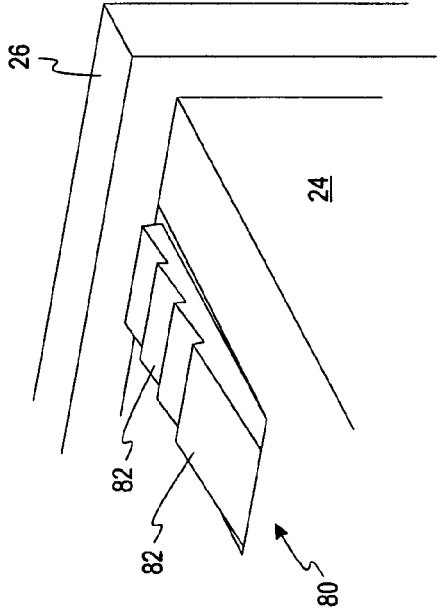
FIG. 7A is a top perspective of a flexible member integral to a meter.
Figure 7C:
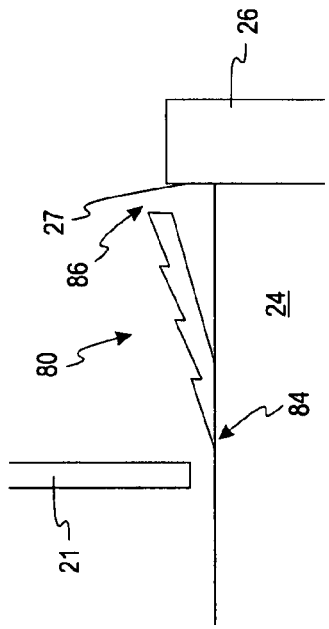
FIG. 7C is a side view of the flexible member of FIG. 7A cantilevered to the meter base.
Figure 7B:
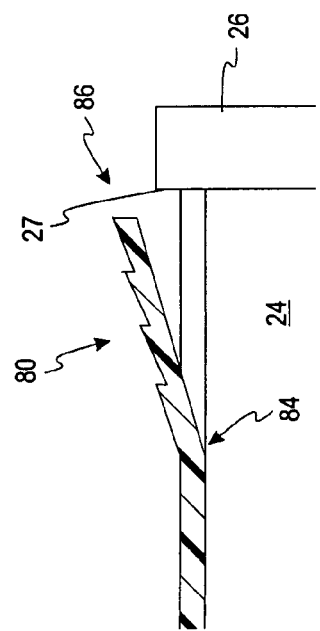
FIG. 7B is a side cross-section of the flexible member of FIG. 7A integral to the meter.

FIGS. 7A-7D illustrate another apparatus for mounting and retaining power monitoring equipment in a door or panel opening. The apparatus includes a flexible member 80 that includes a plurality of ribbed/stepped, inclined planes 82, as shown in FIG. 7A. The flexible member 80 is an integral part of the molded housing 2 and may be made from various plastic resins, such as a polycarbonate blend, a straight polycarbonate, nylon, polypropylene, polyethylene, etc. The flexible member 80 may be molded into at least two opposing surfaces, i.e., on the top and bottom sides 2 and/or on the right and left sides, of the housing 2 of a panel-mounted power monitoring device. The flexible member 80 may protrude at an angle from the housing 2 generally proximate to a flange 27 of the housing 2, as shown in FIGS. 7B and 7C. The flexible member 80 may be cantilevered such that a tapered first end 84 of the flexible member 80 is attached to the power monitoring equipment while a second end 86 is unattached and movable in a vertical direction. In another embodiment, the stepped, flexible member 80 may be connected to the device at both the first end 84 and the second end 86 and include a hinge portion (not shown) that allows the flexible member 80 to flex inwards upon insertion of the power monitoring equipment through a door or panel opening.

Figure 7D:
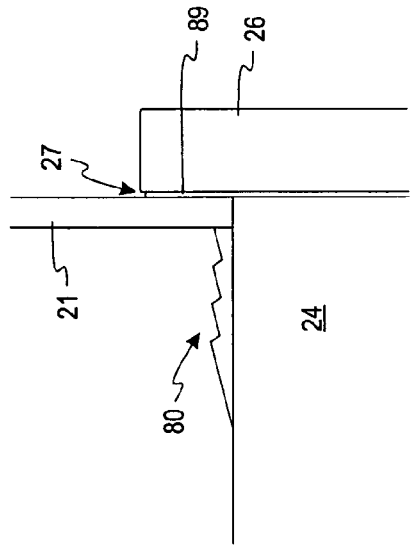
FIG. 7D is a side view of the meter retained in a door or panel opening via the flexible member of FIG. 7A.

As the power monitoring equipment is inserted through the front of a panel opening, as shown in FIG. 7C, the flexible member 80 leads in with the first end 84 and, as the stepped, inclined planes 82 engage or grip the edges of the panel opening 21, the stepped, inclined planes 82 flex inwards toward the body portion 24 of the power monitoring equipment. As the power monitoring equipment is pushed farther into the panel opening, the stepped, inclined planes 82 "click" as they are ratcheted past the sides of the panel 21. The power monitoring equipment continues to be pushed through the panel opening until the last engageable stepped, inclined plane 82 is clicked into position, as shown in FIG. 7D. The last engageable stepped, inclined plane 82 exerts a force on the rear surface of the panel 21. This force pulls the face portion 26 of the housing 2 in the forward direction toward the front surface of the panel 21. As the flanged portion 27 of the housing 2 is larger than the size of the panel opening, the face portion 26 is pulled up to the front surface of the panel 21 such that the flanged portion 27 abuts the front surface of the panel 21 but is too large to be pulled through the panel opening. Thus, the power monitoring equipment is held in place within the panel opening due to the force of the stepped, inclined planes 82 of the flexible member 80 exerted on the rear surface of the panel 21 which pulls the flanged portion 27 up to the front surface of the panel 21.

The spacing of the stepped, inclined planes 82 may accommodate a range of panels with varying thicknesses. In some embodiments, the width of the stepped, inclined planes 82 may be equal to the panel thickness. In other embodiments, the width of the stepped, inclined planes 82 may be smaller or larger than the panel thickness. To help with the sealing effect, in some embodiments, a compressible gasket 89 may be incorporated between the front surface of the door or panel 21 and the flange portion of the power monitoring equipment. The gasket 89 may be compressed between the flange portion and the front surface of the door or panel 21 during the insertion and retention process. This provides a more "rattle-free" mount scenario. The use of the gasket 89 also provides a "slop" removal feature to fill in the space where the flexible member 80 may not provide an exact fit.

The width and number of the stepped, inclined planes 82 can be increased or decreased to accommodate the weight of the power monitoring equipment being retained. Furthermore, multiple flexible members 80 may be molded to one side or additional sides of the power monitoring equipment as needed to retain devices having greater weights.

The flexible member 80 may be used in residential, commercial or industrial environments, and anywhere an electronic device is required to be retained in a panel, without the need for additional parts or tools. It provides an inexpensive, integrated retention solution for small to medium-sized mounted electric devices for virtually no added cost and with a low-profile form factor. The flexible member 80 also provides advantages over other designs that are either cumbersome to attach and detach or are more costly and require greater height to achieve retention. This particular embodiment also allows a user to mount and retain the power monitoring device from the front side of the panel which may provide advantages over other mounting and retaining devices that must be implemented from the back side of the panel.

Figure 8A:
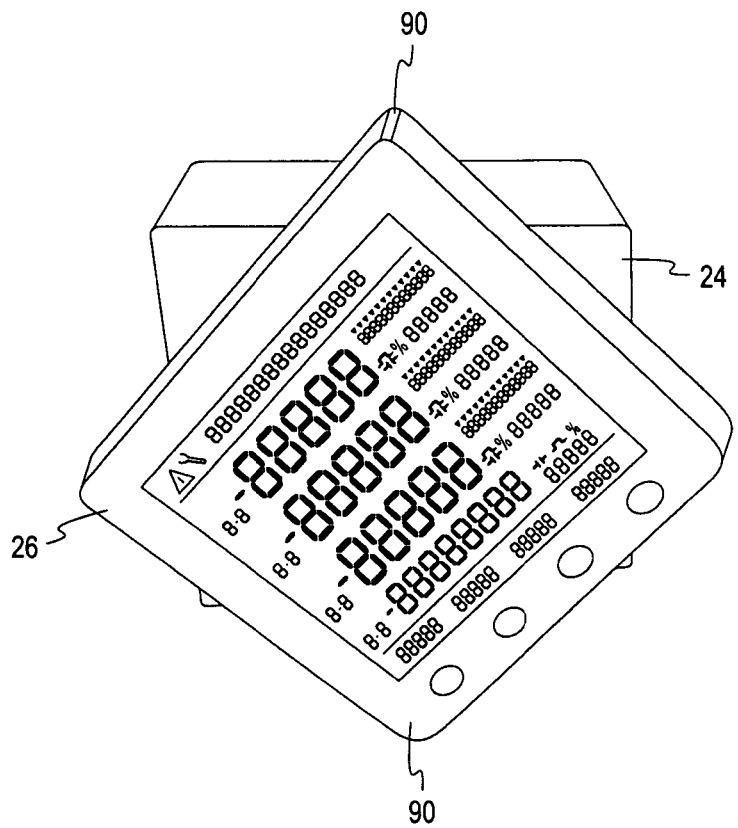
FIG. 8A is a front perspective of the body portion of a meter base being rotationally offset from the face portion of the meter base in a panel or door opening insertion orientation.
Figure 8B:
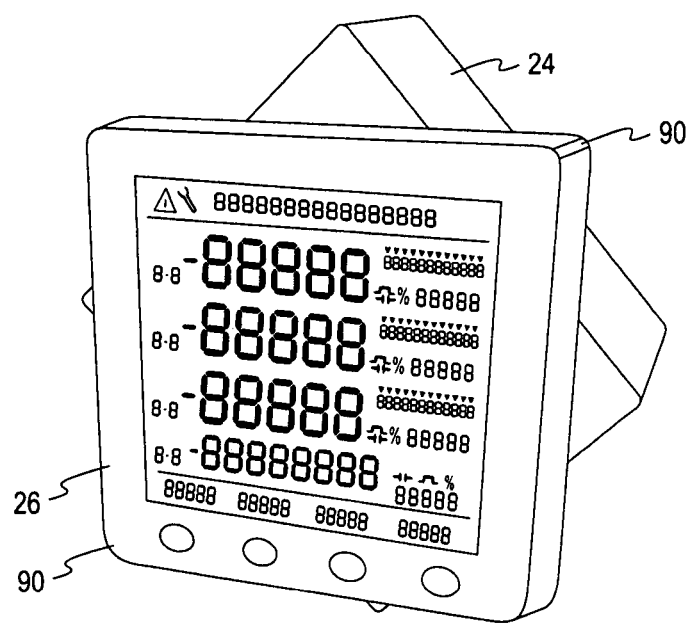
FIG. 8B is a further front perspective of the body portion of a meter base being rotationally offset from the face portion of the meter base in a panel or door opening installed orientation.
Figure 8C:
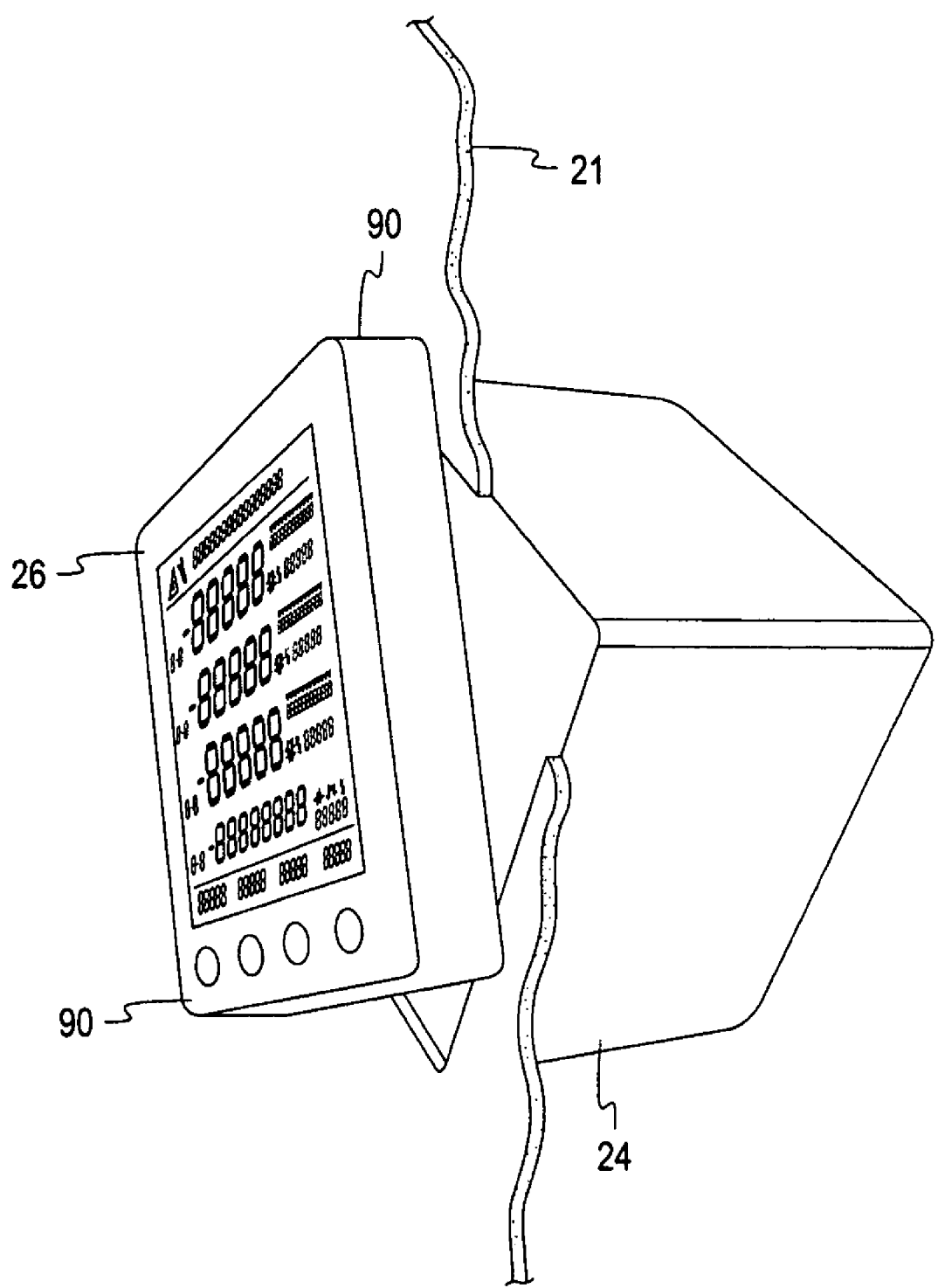
FIG. 8C is a side perspective of the meter base inserted into a door or panel opening.

FIGS. 8A-8B illustrate a method for mounting and retaining power monitoring equipment in a door or panel opening. The method includes rotationally offsetting the body portion 24 of the power monitoring equipment relative to the face portion 26 at an angle of about 10 degrees to about 45 degrees, as shown in FIGS. 8A and 8B. This method can be used with any generally rectilinear or oblong opening and similar-shaped power monitoring devices.

For example, in one embodiment, the body portion 24 of the power monitoring equipment is rotationally offset from the face portion 26 by approximately 45 degrees and is inserted into a square opening having normal orientation, i.e., the top and bottom edges of the opening are parallel to the floor and the side edges are parallel to any walls (see FIG. 8A). Upon inserting the body portion 24 into the panel opening in the normal square orientation, the face portion 26 of the device appears to sit in a diamond orientation, with the corners 90 of the face portion 26 "on point." In other words, the sides of the face portion are at an angle (not parallel) with the sides of the panel opening (see FIG. 8C).

The power monitoring equipment, including the face and body portions 24, 26, is then rotated in the panel opening such that the face portion 26 now appears to be "square" while the body portion 24 is "on point," meaning that the sides of the face portion are parallel with the sides of the panel opening and the sides of the body portion are at an angle with the sides of the panel opening. Thus, the body portion 24 sits at a 45 degree rotated position relative to the face portion 26 (see FIG. 8B). In this position, the meter cannot be pulled back out of the opening as the corners of the meter housing 2 are behind the panel 21. Compressible gasket material, spring members, or ramps (not shown) proximate the face portion 26 of the meter housing 2 engage the rear surface of the door or panel 21 as the meter is rotated into the installed position. Force exerted on the rear surface of the door or panel 21 by the compressed gasket, spring members or ramps cause the face portion 26 to be pulled toward the front surface of the panel 21.

This rotationally offset mounting method may be used in residential, commercial or industrial environments, and anywhere an electronic device is required to be retained in a door or panel 21. This method provides a retention solution for panel-mounted electronic devices and requires no additional components or tools. The resulting orientation of the body portion also provides greater visibility of surfaces for labeling and connectivity functions.

As noted above, in addition to the mounting and retaining the meter/display assembly, it is also possible to retain a remote-mounted display module 20 as shown in FIG. 2. The display module 20 may be mounted in the door or panel opening 21 using the apparatus and methods described herein. For example, the display module 20 may be mounted in a panel opening using the rotational offsetting method, such that the display module 20 is rotationally offset from the meter base 1. Additionally, the elastomeric sheet or washer 50 or the flexible member 80 may be used to mount the display module 20 in a panel opening. It is contemplated that other apparatus described here may be used to mount and retain the display module 20, depending on the size and width of the display module 20 itself.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

The invention claimed is:

1. A system for mounting and retaining an electronic device in a panel having an opening, the system comprising:
    a power monitoring device for monitoring characteristics of the power transmitted through one or more power lines, the power monitoring device including a face portion and a body portion; and
    an apparatus coupled to the power monitoring device and adapted to secure the power monitoring device within the panel opening by engaging at least one surface of the panel, wherein the apparatus comprises interlocking components that rotate into a locked position to secure the power monitoring device within the panel opening, said interlocking components including (i) an inner component including a circular hub having a toothed disk and (ii) an outer component including a circular member having a locking flex member and a cam element, the outer component being adapted to mate with the inner component and to rotate around the circular hub when the inner and outer components are attached to the body portion of the power monitoring device that is inserted into the opening in the panel, and wherein as the outer component is rotated, the toothed disk locks against the locking flex member and the cam element exerts pressure against the at least one surface of the panel to hold the power monitoring device within the panel opening.

2. A system for mounting and retaining an electronic device in a panel having an opening, the system comprising:
    a power monitoring device for monitoring characteristics of the power transmitted through one or more power lines, the power monitoring device including a face portion and a body portion; and
    an apparatus coupled to the power monitoring device and adapted to secure the power monitoring device within the panel opening by engaging at least one surface of the panel, wherein the apparatus comprises a flexible member integrated within the body portion of the power monitoring device, and including a plurality of stepped, inclined planes adapted to engage the sides of an opening in a panel, and wherein as the power monitoring device is inserted into the opening in the panel, the plurality of stepped, inclined planes grip the at least one surface of the panel and allow the power monitoring device to be retained in the panel opening.

* * * * *